United States Patent
Zepp et al.

(10) Patent No.: US 7,863,789 B2
(45) Date of Patent: Jan. 4, 2011

(54) BRUSHLESS PERMANENT MAGNET MOTOR/GENERATOR WITH AXIAL ROTOR DECOUPLING TO ELIMINATE MAGNET INDUCED TORQUE LOSSES

(75) Inventors: Lawrence P. Zepp, Fort Wayne, IN (US); Jerry W. Medlin, Fort Wayne, IN (US)

(73) Assignee: Dura-Trac Motors, Inc., Fort Wayne, IN (US)

( * ) Notice: Subject to any disclaimer, the term of this patent is extended or adjusted under 35 U.S.C. 154(b) by 815 days.

(21) Appl. No.: 11/583,590

(22) Filed: Oct. 19, 2006

(65) Prior Publication Data

US 2007/0096581 A1    May 3, 2007

Related U.S. Application Data

(60) Provisional application No. 60/728,179, filed on Oct. 19, 2005.

(51) Int. Cl.
*H02K 1/27* (2006.01)
*F16C 29/06* (2006.01)

(52) U.S. Cl. .......................... 310/90; 310/190; 310/191
(58) Field of Classification Search .................. 310/90, 310/114, 190, 191, 209, 266
See application file for complete search history.

(56) References Cited

U.S. PATENT DOCUMENTS

| | | | |
|---|---|---|---|
| 4,649,241 A * | 3/1987 | Young et al. ............. | 200/82 R |
| 5,763,977 A | 6/1998 | Shimasaki et al. | |
| 5,789,881 A * | 8/1998 | Egami et al. ................ | 318/139 |
| 6,137,203 A | 10/2000 | Jermakian et al. | |
| 6,249,069 B1 * | 6/2001 | Krueger ....................... | 310/74 |
| 6,492,753 B2 | 12/2002 | Zepp et al. | |
| 6,497,635 B2 * | 12/2002 | Suzuki ......................... | 477/3 |
| 6,555,941 B1 * | 4/2003 | Zepp et al. .................. | 310/191 |
| 6,844,647 B2 | 1/2005 | Horber et al. | |
| 6,943,478 B2 | 9/2005 | Zepp et al. | |

FOREIGN PATENT DOCUMENTS

| GB | 2 266 418 A | 10/1993 |
|---|---|---|
| WO | WO 03/077403 A1 | 9/2003 |

* cited by examiner

*Primary Examiner*—Quyen Leung
*Assistant Examiner*—David W. Scheuermann
(74) *Attorney, Agent, or Firm*—Brinks Hofer Gilson & Lione (57) ABSTRACT

A permanent magnet motor/generator that includes a stator, a rotor provided with a plurality of permanent magnets at a peripheral surface thereof and having a central axis which coincides with the central axis of the stator, a rotatable shaft upon which the rotor is coupled, and an actuator for moving the rotor with respect to the stator axially along the rotatable shaft a sufficient distance to completely decouple the rotor from the stator so as to eliminate magnet induced torque drag. When the permanent magnet/generator is used in parallel hybrid vehicles, the ability to completely decouple the rotor from the stator greatly improves range and efficiency. In addition, by progressively engaging the rotor with the stator a desired voltage output can be obtained upon deceleration.

20 Claims, 9 Drawing Sheets

BRUSHLESS PERMANENT MAGNET MOTOR/GENERATOR WITH AXIAL ROTOR DECOUPLING TO ELIMINATE MAGNET INDUCED TORQUE LOSSES

RELATED APPLICATION

This application is based on U.S. Provisional Patent Application Ser. No. 60/728,179, filed Oct. 19, 2005 to which priority is claimed under 35 U.S.C. §120.

TECHNICAL FIELD

The present invention relates primarily to electric motor/generator drive systems that are used in parallel hybrid automotive systems. More particularly, the present invention relates to a method and system for eliminating parasitic torque losses that are caused when rotating magnets pass electrical steel when a motor/generator unit is not energized during constant speed operation of a vehicle. Even more particularly, the present invention relates to a method and system for reducing magnetic drag factors by axial rotor decoupling when used in parallel hybrid vehicles to improve range and efficiency.

BACKGROUND ART

Many automotive hybrid electric vehicles utilize the "parallel hybrid configuration" where an electric motor/generator is used in the vehicle driveline. The typical motor/generator is a permanent magnet brushless type that is often integrated into the transmission housing. During vehicle braking, the unit operates or functions as a generator, providing braking torque and conserving vehicle kinetic energy as "regen" or stored generated energy in batteries or other means. When the driver commands acceleration after a stop, this stored electrical energy runs the motor to provide additional torque to the vehicle drive system, saving fuel and allowing a smaller engine to be utilized.

When the vehicle is traveling at a constant speed, the motor/generator permanent magnet rotor is rotating but is normally de-energized and idle and the vehicle's internal combustion engine is the primary source of power. This highlights the principal difference in motor/generator function between the parallel hybrid and a series hybrid or pure electric vehicle. The typical parallel hybrid system operates the motor/generator intermittently and has significant periods of inactivity during constant speed operation where magnet induced iron losses induce parasitic drag torque to the vehicle. In series hybrid or pure electric drive systems, the motor/generator is the vehicle's prime accelerator and the motor/generator duty cycle parallels the vehicle speed. When the motor/generator is idle in the series hybrid or pure electric vehicle case, the vehicle is at rest. Because of this, significant periods of magnet induced iron losses are eliminated when the motor/generator is the vehicle's prime accelerator.

The present invention is directed to a method of eliminating magnet induced torque losses of permanent magnet motors/generators that are used in parallel hybrid configurations.

During the constant speed cycle, even though the stator coils of the motor/generator are de-energized, the spinning high strength magnets in the motor create a parasitic torque drag on the vehicle. Whenever rotating magnetic fields cut through the electrical steel and iron materials from which the stators are normally made, the magnetic flux densities produce "iron losses" that dissipate energy as heat. The iron losses generally vary as square functions of the frequency and the magnetic flux density or strength. At high rotational speeds, the iron losses of a permanent magnet machine can require considerable power levels that cause parasitic drag and stator heating. This parasitic drag detracts from the overall efficiency and fuel savings of the parallel hybrid system. A driving cycle involving prolonged constant speed highway and long distance driving will sacrifice fuel economy due to the significant power consumed by the iron losses of the motor/generator.

Many embodiments of this parallel hybrid vehicle technology rotate the motor/generator whenever the vehicle is moving. In many cases this is merely done for simplicity and cost savings. Methods to modify and reduce the parasitic drag of iron losses must change either the rotational speed of the magnets or reduce the magnetic strength of the permanent magnet rotor. If reductions of iron losses can be achieved during long term, constant speed operation, then parasitic torque drag on the vehicle will reduce and fuel economy will be improved.

A clutch arrangement can be used to de-couple the motor/generator from the vehicle drive line during "de-energized" periods. This is not common, due to the cost and durability issues involved. In the field of electric vehicle traction motors, several patents teach methods of permanent magnet field weakening to achieve an extended speed range. U.S. Pat. Nos. 6,492,753 and 6,555,941 to Zepp et al. disclose a magnetic field weakening method that axially offsets the internal permanent magnet rotor from the electrical steel laminations of the stator for extended speed range. Also U.S. Pat. No. 6,943,478 to Zepp et al. discloses a magnetic field weakening method that axially offsets the external permanent magnet rotor of a hub motor from the electrical steel laminations of the internal stator for extended speed range.

U.S. Pat. No. 6,844,647 to Horber discloses a permanent magnet rotor that includes an inner sleeve and an outer sleeve with varying positional relationships that vary magnetic flux.

U.S. Pat. No. 6,137,203 to Jermakian et al. discloses a method of magnetic air gap adjustment to achieve extended speed in an axial gap type motor.

The primary focus these patents is the variation of permanent magnet flux to extend motor speed and constant power operation. When these prior art techniques are applied to parallel hybrid systems, their field weakening will reduce, but not eliminate, the parasitic torque drag characteristic commonly found during constant speed operation.

The present invention is directed to a method and system for eliminating parasitic torque losses that are caused when rotating magnets pass electrical steel when a motor/generator unit is not energized during constant speed operation of a vehicle.

DISCLOSURE OF THE INVENTION

According to various features, characteristics and embodiments of the present invention which will become apparent as the description thereof proceeds, the present invention provides a permanent magnet motor/generator that includes:

a stator having a plurality of stator magnetic poles and windings for generating a rotating filed in the stator magnetic poles, said stator having a central axis;

a rotor provided with a plurality of permanent magnets at a peripheral surface thereof and having a central axis which coincides with the central axis of the stator;

a rotatable shaft upon which the rotor is coupled, the rotatable shaft having a central axis which coincides with the central axis of the stator; and an actuator for moving the rotor with respect to the stator axially along the rotatable shaft a sufficient distance to completely decouple the rotor from the stator so as to eliminate magnet induced torque drag.

The present invention further provides a method of method of operating a permanent magnet motor/generator so as to eliminate magnet induced torque drag which method involves:

providing permanent magnet motor/generator that includes: a stator having a plurality of stator magnetic poles and windings for generating a rotating filed in the stator magnetic poles, said stator having a central axis; a rotor provided with a plurality of permanent magnets at a peripheral surface thereof and having a central axis which coincides with the central axis of the stator; and a rotatable shaft upon which the rotor is coupled, the rotatable shaft having a central axis which coincides with the central axis of the stator; and moving the rotor with respect to the stator axially along the rotatable shaft a sufficient distance to completely decouple the rotor from the stator so as to eliminate magnet induced torque drag.

The present invention also provides a parallel hybrid vehicle which comprises an internal combustion engine and a permanent magnetic motor/generator, wherein the permanent magnet motor/generator includes: a stator having a plurality of stator magnetic poles and windings for generating a rotating filed in the stator magnetic poles, said stator having a central axis; a rotor provided with a plurality of permanent magnets at a peripheral surface thereof and having a central axis which coincides with the central axis of the stator; a rotatable shaft upon which the rotor is coupled, the rotatable shaft having a central axis which coincides with the central axis of the stator; and an actuator for moving the rotor with respect to the stator axially along the rotatable shaft a sufficient distance to completely decouple the rotor from the stator so as to eliminate magnet induced torque drag.

BRIEF DESCRIPTION OF THE DRAWINGS

The present invention will be described with reference to the attached drawings which are given as non-limiting examples only, in which.

BEST MODE FOR CARRYING OUT THE INVENTION

The present invention is directed to a brushless permanent magnet motor/generator designs that are configured for drive shaft or transmission mounting locations in motor vehicles. The inclusion of the motor/generator into the vehicle system enables a parallel hybrid capability that can capture and conserve or store a portion of the vehicle deceleration energy and re-apply this stored energy to the next vehicle acceleration. This use of conserved electrical energy reduces the fuel consumption and pollutant emissions during vehicle acceleration and increases the vehicle's miles per gallon rating. The most significant reductions in fuel usage and emissions are realized in driving cycles with frequent start/stop cycles.

The permanent magnet rotors of the present invention are coupled to drive shafts by constant velocity bearings which allow the rotors to move axially with respect to the motor shafts and stators while they are rotating. During operation as a motor, increasing the axial displacement of the permanent magnet rotor reduces the magnetic flux on the stator field coils, reducing the induced back emf that limits the maximum rotational speed of the motor and allows higher speed operation. When operating as a generator, increasing the axial displacement of the permanent magnet rotor reduces the magnetic flux on the stator field coils and reduces the generated voltage to keep within the system voltage limits. As the vehicle speed decreases in generator mode, reducing the axial displacement of the permanent magnet rotor increases the magnetic flux on the stator field coils and increases the generated voltage to maximize energy capture during deceleration. When the vehicle reaches a constant speed or the stored electrical energy is depleted, the spinning rotor is displaced axially to totally decouple the rotor magnets from the stator iron when the system is not energized. This eliminates the magnetically induced torque drag due to iron losses during periods of constant speed driving when the system is not active. A motor controller provides active control of rotor position as the vehicle transitions between motoring, generating and idle modes.

Figure 1:
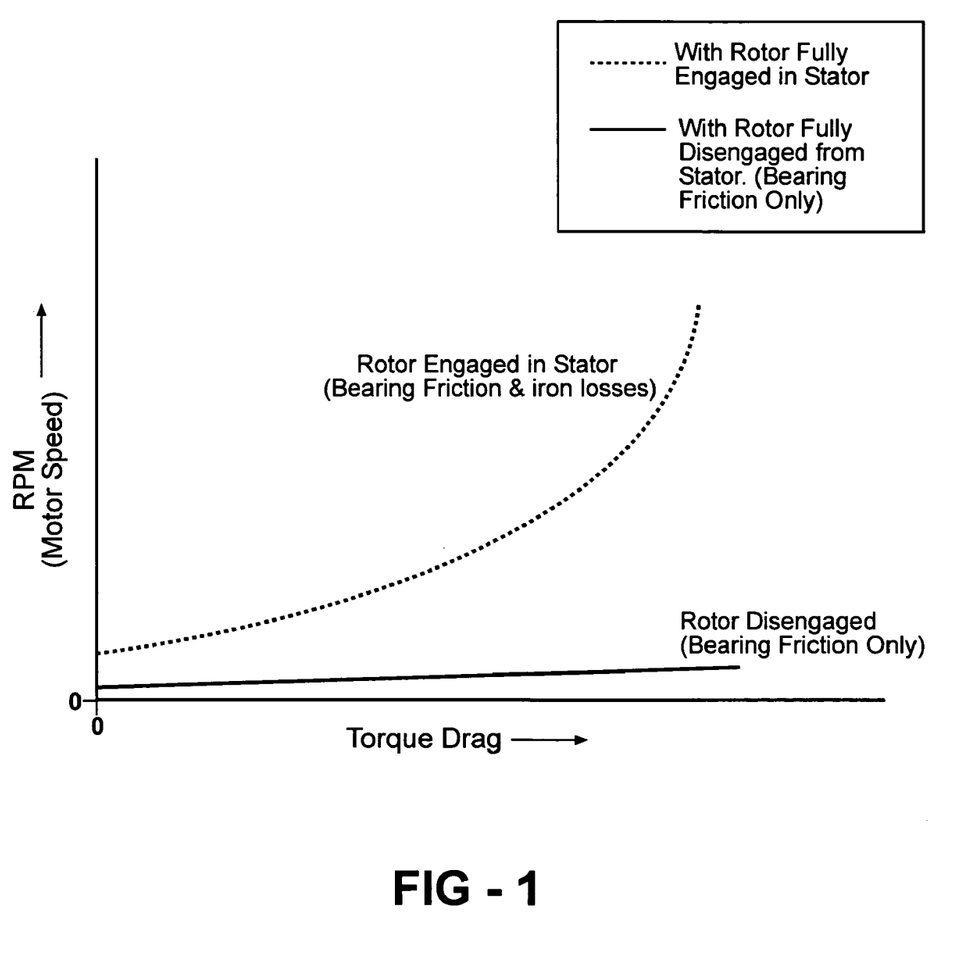
FIG. 1 is a graph showing iron loss torque drag vs. speed in a permanent magnet motor, with and without decoupling of the permanent magnet rotor from the stator.

FIG. 1 is a graph depicting the relationship between iron loss torque drag and rotational speed when the motor/generator coils are not energized. The graph line labeled "rotor engaged" shows the increasing effect of iron loss torque drag with rotational speed. This illustrates the parasitic drag that detracts from overall fuel savings during extended highway driving. The graph line labeled "rotor disengaged" illustrates that decoupling of the magnet rotor from the stator laminations reduces the torque drag so that it can be limited to only the shaft bearing friction. In the "rotor disengaged" position, the fuel savings gained by the regeneration of braking energy during start/stop driving are conserved and overall fuel efficiency of the system are preserved.

Figure 2:
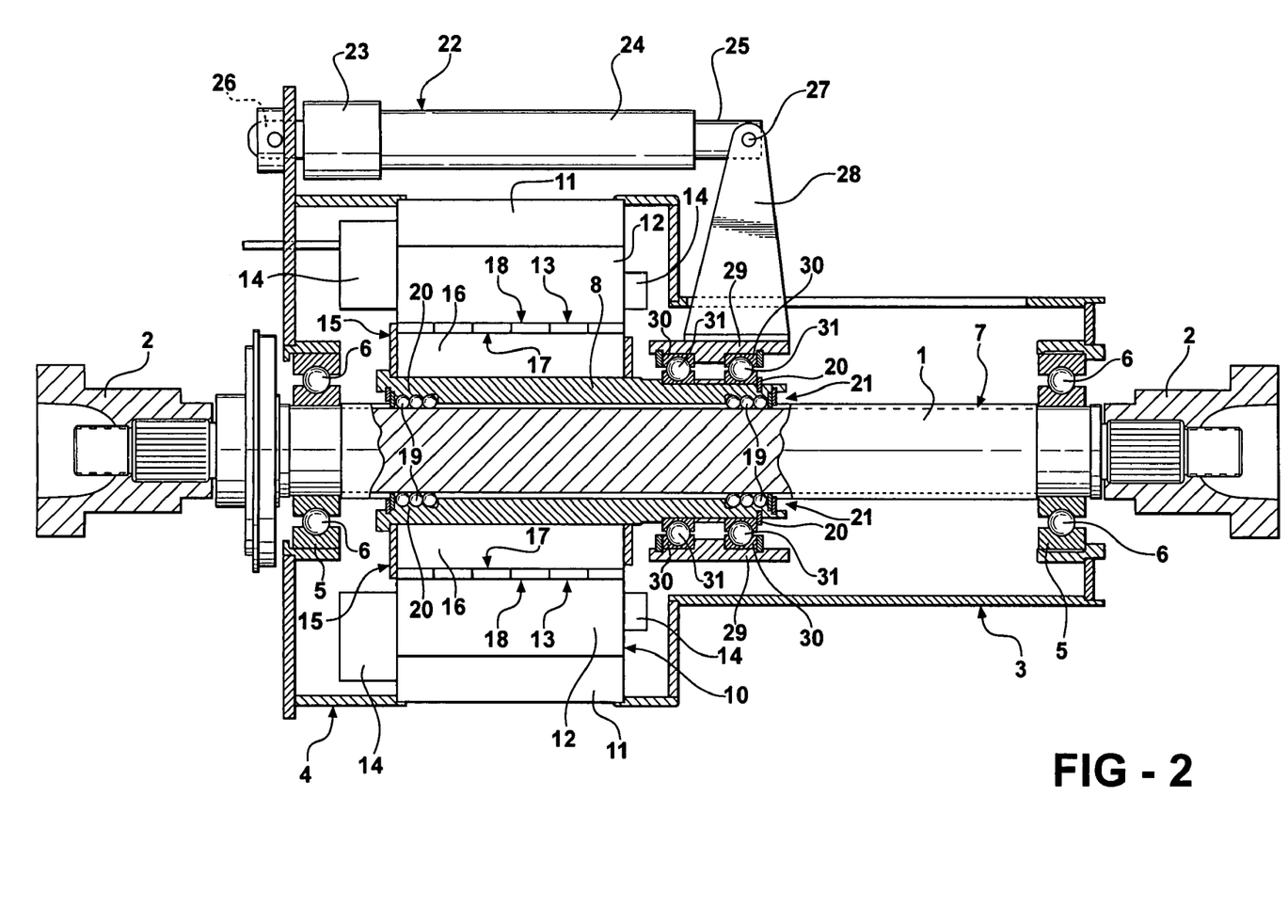
FIG. 2 is a cross sectional view of the permanent magnet motor/generator according to one embodiment of the present invention in which the permanent magnet rotor is fully engaged with the stator.

FIG. 2 is a cross sectional view of the permanent magnet motor/generator according to one embodiment of the present invention in which the rotor is fully engaged with the stator. The permanent magnet motor/generator includes a motor shaft 1 that is coupled at both ends to a structure identified by reference numeral 2 that represents a universal joint yoke or coupling to a drive shaft or other structure transmitting rotational power to a vehicle's drive wheels. The motor shaft 1 is supported by an extended housing 3 and housing 4 on the opposite ends of motor shaft 1. The motor shaft 1 is supported in housings 3 and 4 by bearing assemblies 5 which can include radial ball bearings 6 or can comprise any other suitable type of bearing structure/assembly. The motor shaft 1 is supported in a manner that allows the motor shaft 1 to rotate within housings 3 and 4, but restricts axial movement of motor shaft 1 between housings 3 and 4.

The motor shaft 1 depicted in FIG. 2 can include a stepped portion (not shown) at either end thereof beyond the range of movement of the rotor along shaft 1 which is configured to allow ball bearings 19 to be placed between the motor shaft 1 and rotor collar 8 as discussed in more detail below.

The stator 10 is supported in housing 3 and 4 so that there is an annular space between the stator 10 inside diameter and the rotor 15 outside diameter allowing moveable positioning.

The stator 10 includes a stator ring 11 that includes or supports a plurality of stator teeth 12 along an inner periphery of stator ring 11. The stator teeth 12 have concave inner surfaces 13 (see FIG. 6), and are evenly spaced along the inner periphery of the stator ring 11. Wire coils 14 that are wound around stator teeth 12 and can be selectively energized to create magnetic forces that cause the rotor 15, rotor collar 8, and motor shaft 1 to rotate.

The rotor 15 comprises a laminated steel member 16 surrounding the rotor collar 8 and has a plurality of permanent magnets 17 that are attached to the outer surface of the laminated steel member 16 so as to be opposed to the stator teeth 12. The permanent magnets 17 can be attached to the outer surface of the laminated steel member 16 using any suitable adhesives, glues, epoxies, etc. The surfaces 18 of the permanent magnets 17 which face the concave inner surfaces 13 of the stator teeth 12 are convex so as to be complementarily shaped to the concave outer surfaces 13 of the stator teeth 12.

The rotor collar 8 which supports the rotor 15 is coupled to the motor shaft 1 by a plurality of ball bearings 19 which are contained within a plurality of axial pockets or grooves 20 that are provided on the inner surface of the rotor collar 8. The ends of these pockets or grooves 20 can be blocked by retaining rings or other structural elements to prevent the ball bearings 19 from coming out of the pockets or grooves 20. The ball bearings 19 are allowed to move axially in a plurality of axial grooves 21 that are formed between the grooves 7 in motor shaft 1 and the pockets 20 in rotor collar 8. Ball bearings 19 couple motor shaft 1 and rotor collar 8 together to provide a constant velocity linear bearing between the motor shaft 1 and the rotor 15. The ball bearings can be inserted within opposed grooves 7 and 20 during assembly by positioning the motor shaft 1 so that the stepped portion of the motor shaft, discussed above, is aligned with the pockets or grooves 20 on rotor collar 8.

The constant velocity linear bearing allows the rotor 15 to be moved axially with respect to the stator 10 by moving the rotor collar 8 axially along motor shaft 1. Movement of the rotor collar 8 along motor shaft 1 is accomplished by means of an actuator mechanism.

The actuator mechanism 22 in FIG. 2 includes a motor and gear reduction 23 which rotates a ball screw mechanism 24 to produce linear motion of the rod 25. The ball screw 24 is rotationally driven by the reversible motor and gear reduction 23 to extend or retract rod 25. One end of actuator 22 is attached to the motor structure by a pin connection 26 or other means. The rod 25 of actuator 22 is attached to shift arm 28 by a pin connection 27 or other means. Shift arm 28 is attached to thrust sleeve 29 which houses a pair of ball assemblies 30 with radial ball bearings 31. The shift arm 28 remains stationary while the rotor collar 8 and motor shaft 1 rotate. The two bearing assemblies 30 allow thrust from actuator rod 25 to be transmitted through arm 28 and into thrust sleeve 29 and rotor collar 8. When actuator 22 extends rod 25, the shift arm 28 acts on the rotor collar 8 and rotor assembly 15 to pull the rotor assembly 15 out of the stator assembly. In alternative embodiments other types of actuators could be used such as pneumatic actuators, hydraulic actuators, other types of electromechanical actuators and even manual actuators.

In operation, the motor as shown in FIG. 2 has the rotor 15 filly engaged with the stator 10 to gain the full effect of permanent magnets 17 on the plurality of stator teeth 12 and stator coils 14. In this configuration the motor will produce a maximum torque but will have a limited base speed.

Figure 3:
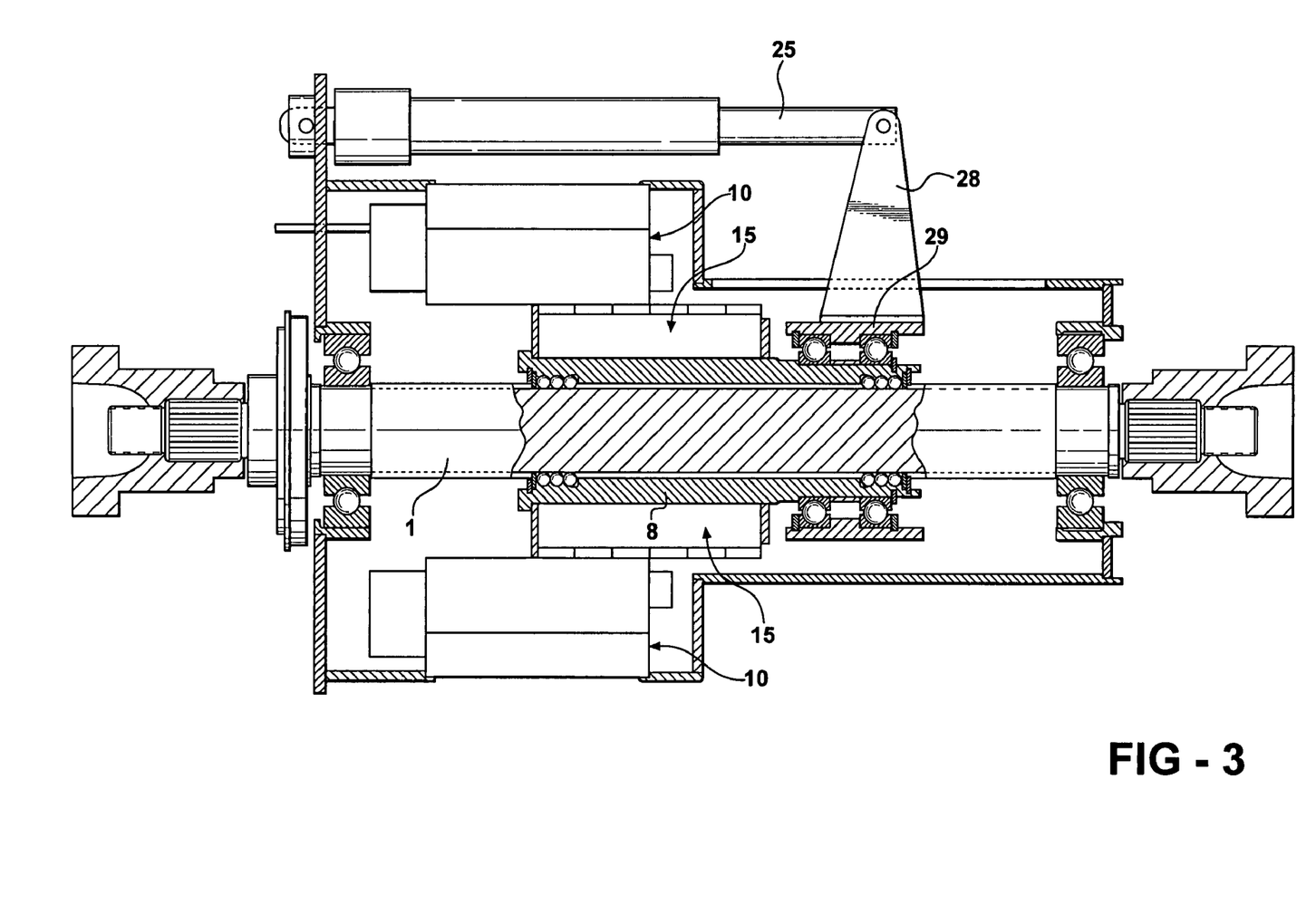
FIG. 3 is a cross sectional view of the permanent magnet motor/generator of FIG. 2 in which the rotor is 50% disengaged with the stator.

FIG. 3 is a cross sectional view of the permanent magnet motor/generator according to one embodiment of the present invention in which the rotor 15 is about 50% disengaged with the stator 10. A comparison between FIGS. 2 and 3 reveals how the cylindrical rotor collar 8 and thrust sleeve 29 are moved axially by shift arm 28 and actuator rod 25 to offset the rotor 15 with respect to the stator 10 along motor shaft 1. In the configuration depicted in FIG. 3 the motor/generator will produce a lower torque than in the configuration depicted in FIG. 2, but will have a higher base speed.

Figure 4:
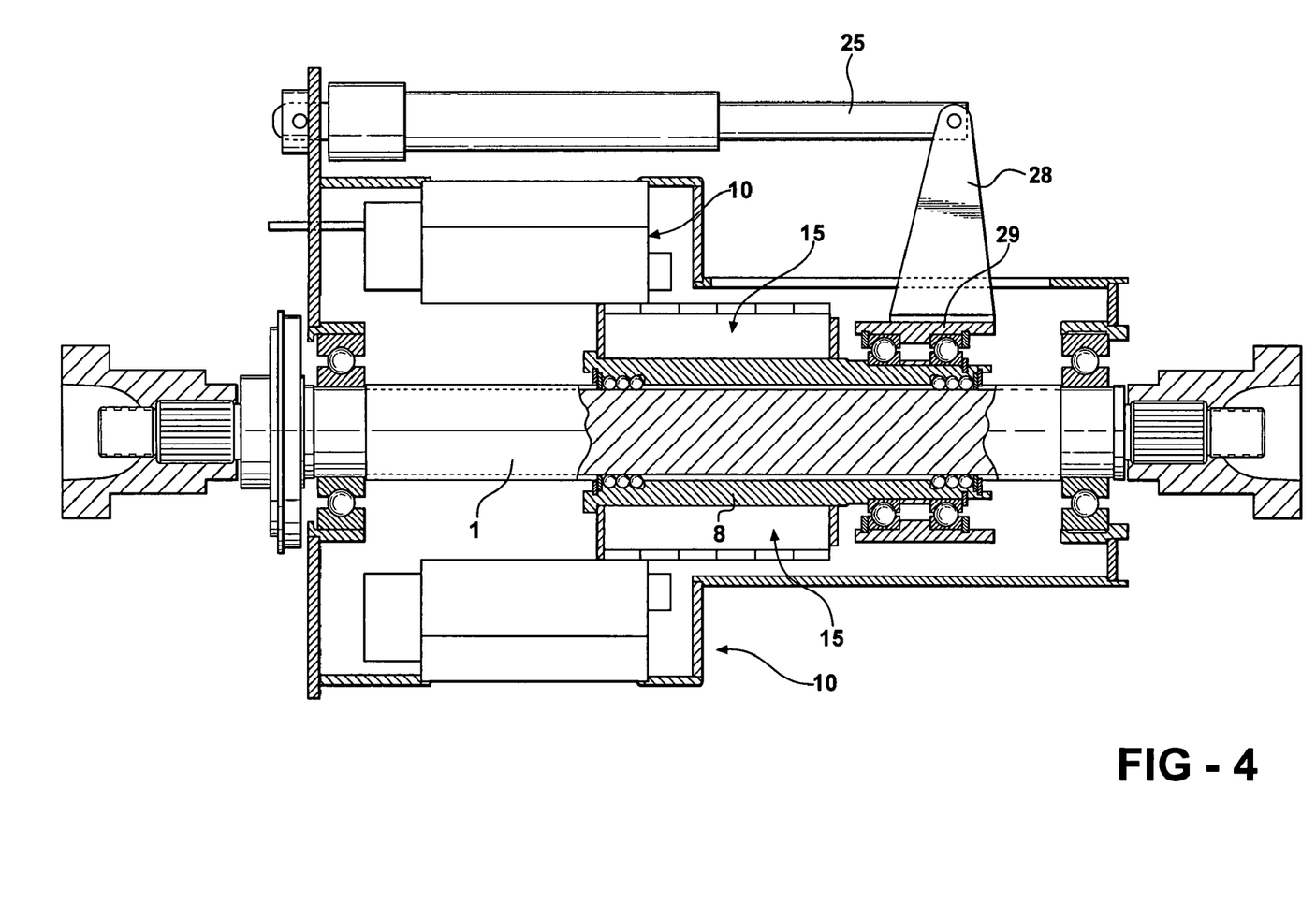
FIG. 4 is a cross sectional view of the permanent magnet motor/generator of FIG. 2 in which the rotor is 80% disengaged with the stator.

FIG. 4 is a cross sectional view of the permanent magnet motor/generator according to one embodiment of the present invention in which the rotor 15 is about 80% disengaged with the stator 10. A comparison between FIGS. 2 and 4 reveals how the cylindrical rotor collar 8 and thrust sleeve 29 is moved axially by shift arm 28 and actuator rod 25 to offset the rotor 15 with respect to the stator 10 along motor shaft 1. In the configuration depicted in FIG. 3 the motor/generator will produce a lower torque than in the configurations depicted in FIGS. 3 and 2, but will have a higher base speed required for motor/generator use at highway driving speeds.

Figure 5:
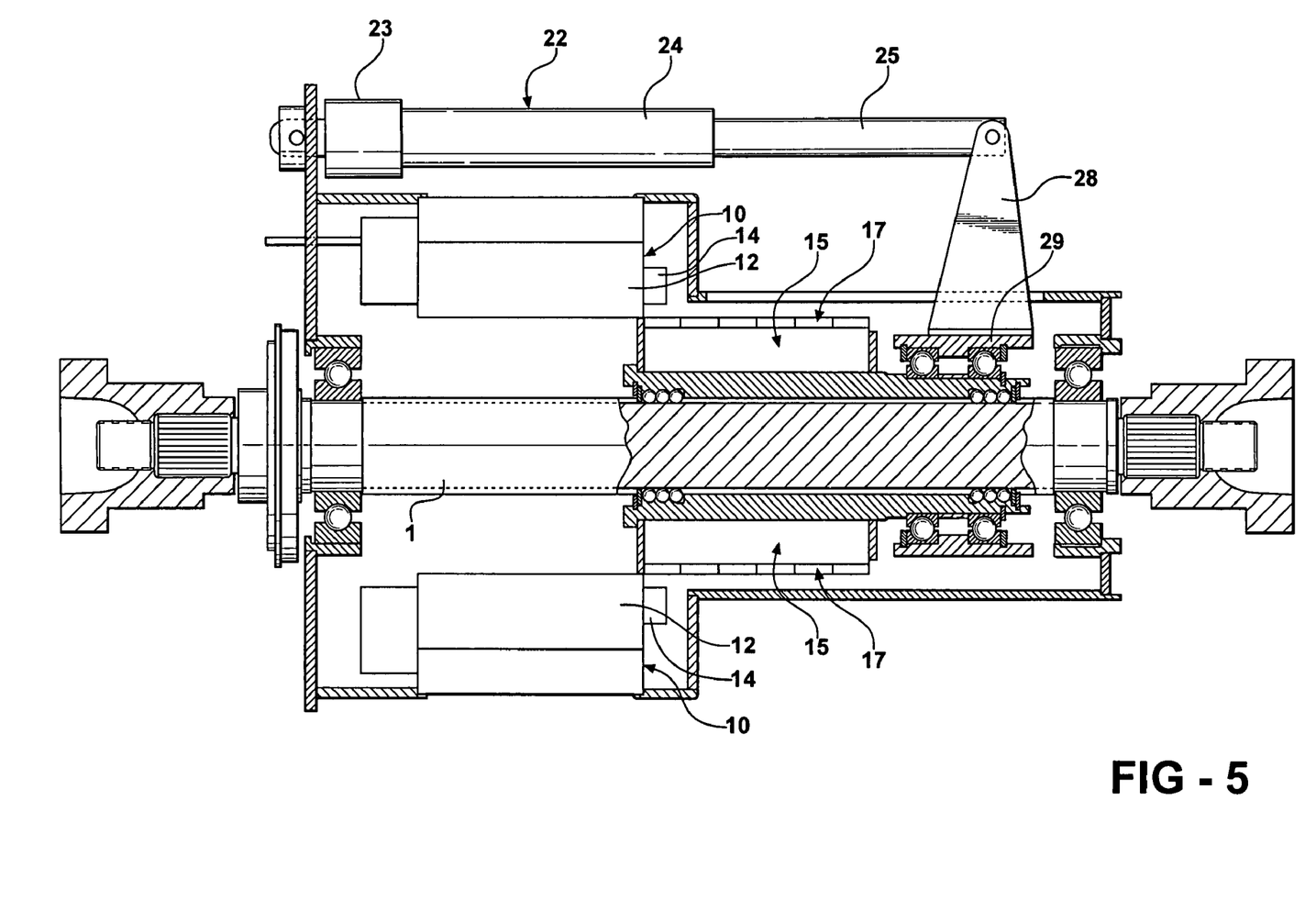
FIG. 5 is a cross sectional view of the permanent magnet motor/generator of FIG. 2 in which the rotor is 100% disengaged with the stator.

FIG. 5 is a cross sectional view of the permanent magnet motor/generator according to one embodiment of the present invention in which the rotor 15 is fully (100%) disengaged with the stator 10. A comparison between FIGS. 2, 3 and 4 reveals how the cylindrical rotor collar 8 and thrust sleeve 29 is moved axially by shift arm 28 and actuator rod 25 to offset the rotor 15 with respect to the stator 10 along motor shaft 1. In the configuration depicted in FIG. 5 the permanent magnets 17 on rotor assembly 15 are magnetically decoupled from the plurality of stator teeth 12 in stator assembly 10. This eliminates the torque drag caused when the rotating magnetic field of the rotor 15 affects the laminated steel construction of the stator teeth 12, causing "iron loss" torque drag. Other prior art permanent magnet motor/generators do not have this magnetic decoupling feature and thus cannot escape the torque drag associated with iron losses. According to the present invention, when a vehicle having the permanent magnet motor/generator is operating on a highway or in a continuous speed mode, the motor/generator is placed in the fully disengaged position shown in FIG. 5 to eliminate parasitic torque losses due to iron losses. This feature increases the fuel savings of hybrid electric vehicles and reduces emissions by reducing parasitic torque drag on the vehicle drive system.

Figure 6:
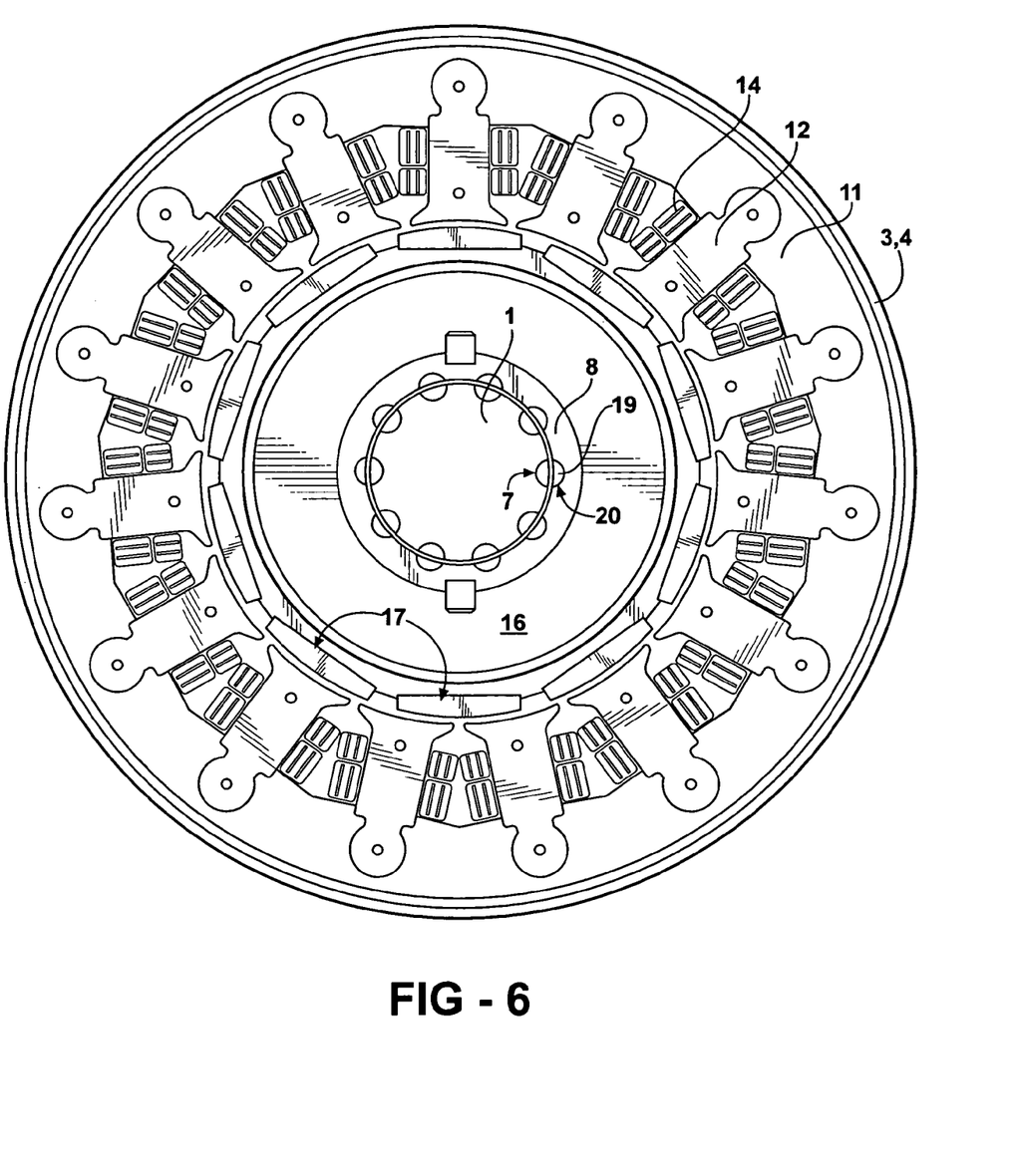
FIG. 6 is a cross sectional end view across section B-B as shown on FIG. 2, showing the rotor and stator fully engaged.

FIG. 6 shows a cross sectional end view taken along section lines B-B in FIG. 2. The central motor shaft 1 has a plurality of grooves 7 that are aligned with pockets or grooves 20 in rotor collar 8 to form a plurality of channels or grooves for ball bearings 19. The laminated steel member 16 of the rotor 15 is mounted on rotor collar 8. Permanent magnets 17 are adhesively bonded onto sections of the laminated steel member 16 to form a plurality of evenly spaced north and south magnetic poles.

Figure 7:
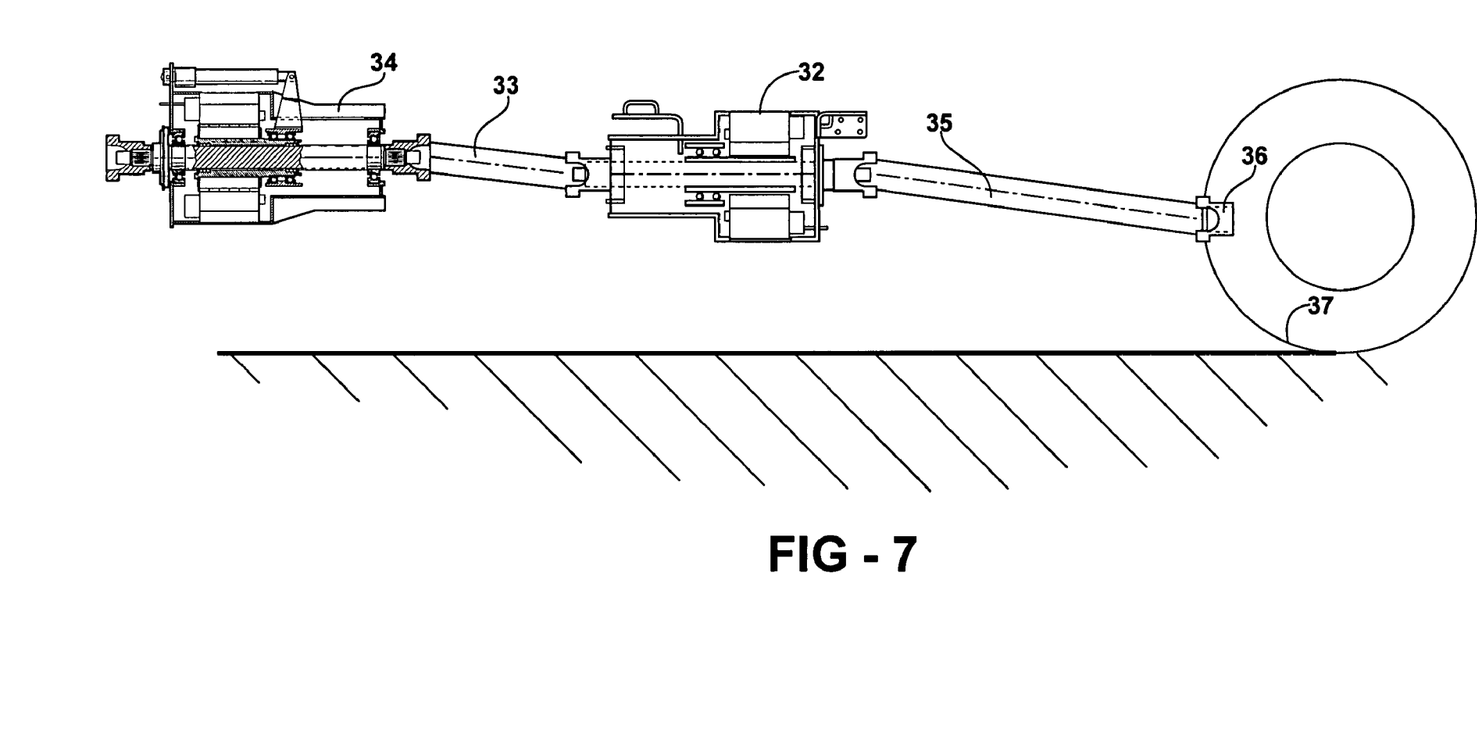
FIG. 7 is a cross sectional view of the permanent magnet motor/generator as it is installed in the drive shaft of a truck or bus.

FIG. 7 shows the motor/generator 32 installed in a typical vehicle. Front drive shaft 33 connects the transmission 34 to the motor/generator unit 32. The opposite end of the motor/ generator 32 is connected to rear drive shaft 35, and then to rear axle 36 and rear wheels 37. When the vehicle containing this motor/generator in the fully disengaged state (FIG. 5) and traveling at constant highway speeds senses a reduction in throttle position, the actuator motor 23 in the shift actuator 22 energizes and rotates in the reverse direction to retract rod 25 and partially re-engage the rotor assembly 15 and the plurality of permanent magnets 17 with the plurality of stator teeth 12 and coils 14 in the stator assembly 10 as shown in FIG. 4. The rotation of the plurality of permanent magnets 17 generates an electrical current in the coils 14 that can be stored in capacitor banks, batteries, or other means. This initial level of regenerated electrical energy (or regen) causes a mild braking torque on the vehicle driveshaft, reducing speed. As the vehicle brakes are applied, the motor/generator control system senses brake system pressure and increases the regen current to increase braking torque on the vehicle drive shaft. As the vehicle speed decreases, actuator motor 23 in the shift actuator 22 energizes and rotates in the reverse direction to retract rod 25 and increase engagement of the rotor assembly 15, as shown in FIGS. 3 and 2, to keep system voltage at a maximum level for most efficient capture of regeneration energy. In this manner, braking torque required by the vehicle driver is provided primarily by the motor/generator and secondarily by the vehicle brakes.

Figure 8:
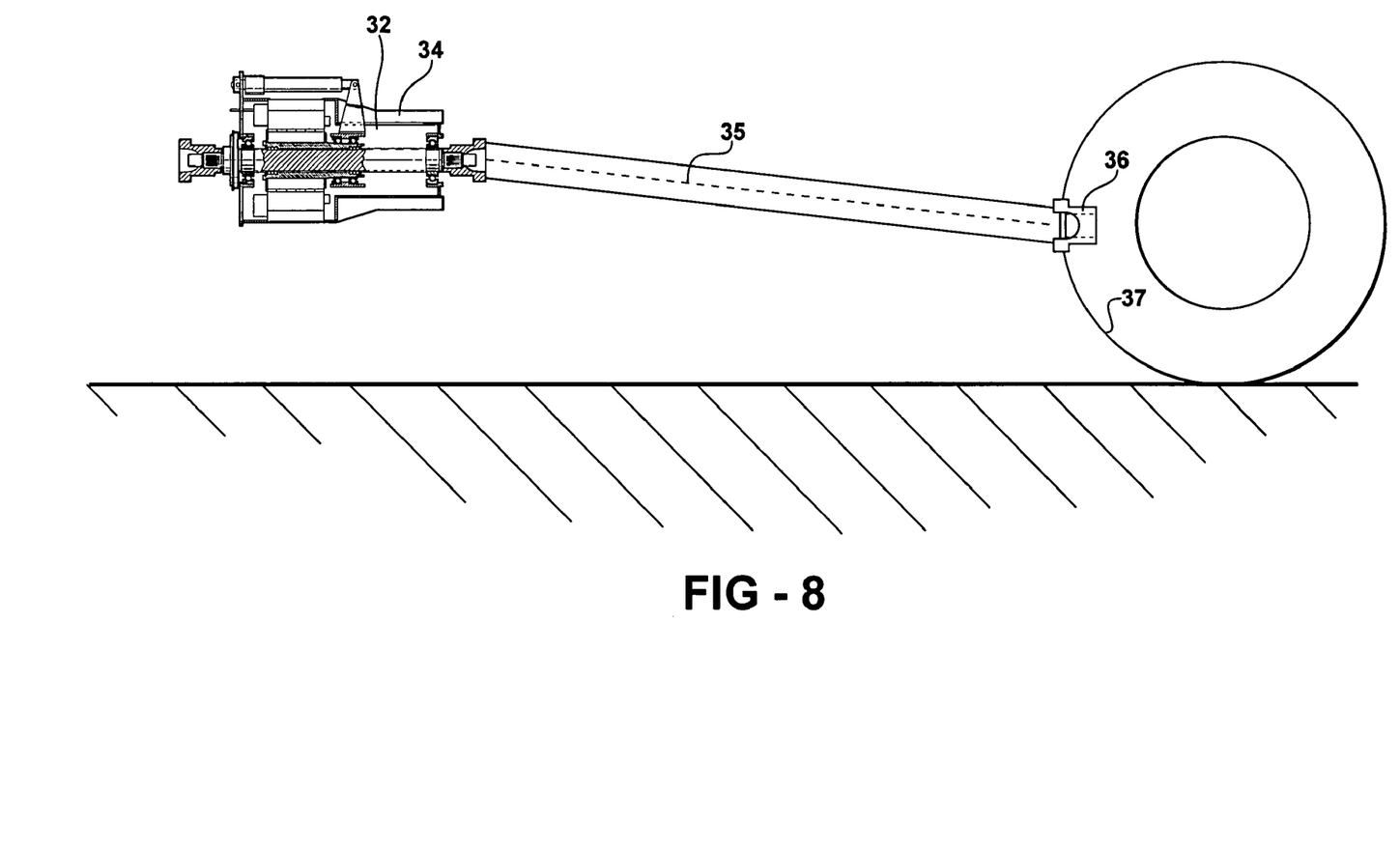
FIG. 8 is a cross sectional view of the permanent magnet motor/generator alternate embodiment as it is installed in the transmission housing of an auto, truck or bus.

FIG. 8 shows an alternate embodiment of this invention where the motor/generator 32 is housed in the transmission 34 and is connected to rear drive shaft 35, rear axle 36 and rear wheels 37.

It is noted that the unique configuration of the permanent magnet motor/generator is used to maximize torque and speed range when operating as a motor and to optimize capture of regenerative energy and voltage when operating as a generator. During deceleration the generator provides braking torque and conserves electrical energy which is stored for the next acceleration cycle. Because the vehicle speed is decreasing, generator output would normally decrease in proportion to speed, adversely affecting efficiency and overall energy storage. By using the axial movement of the permanent magnet rotor with respect to the stator during deceleration, the rotor can be progressively engaged with the stator to produce periods of constant voltage, thus maximizing energy conservation. In addition, the use of full disengagement of the permanent magnet rotor from the stator during periods of highway driving allows a significant savings of energy and fuel due to the reduction of iron loss torque drag.

Figure 9:
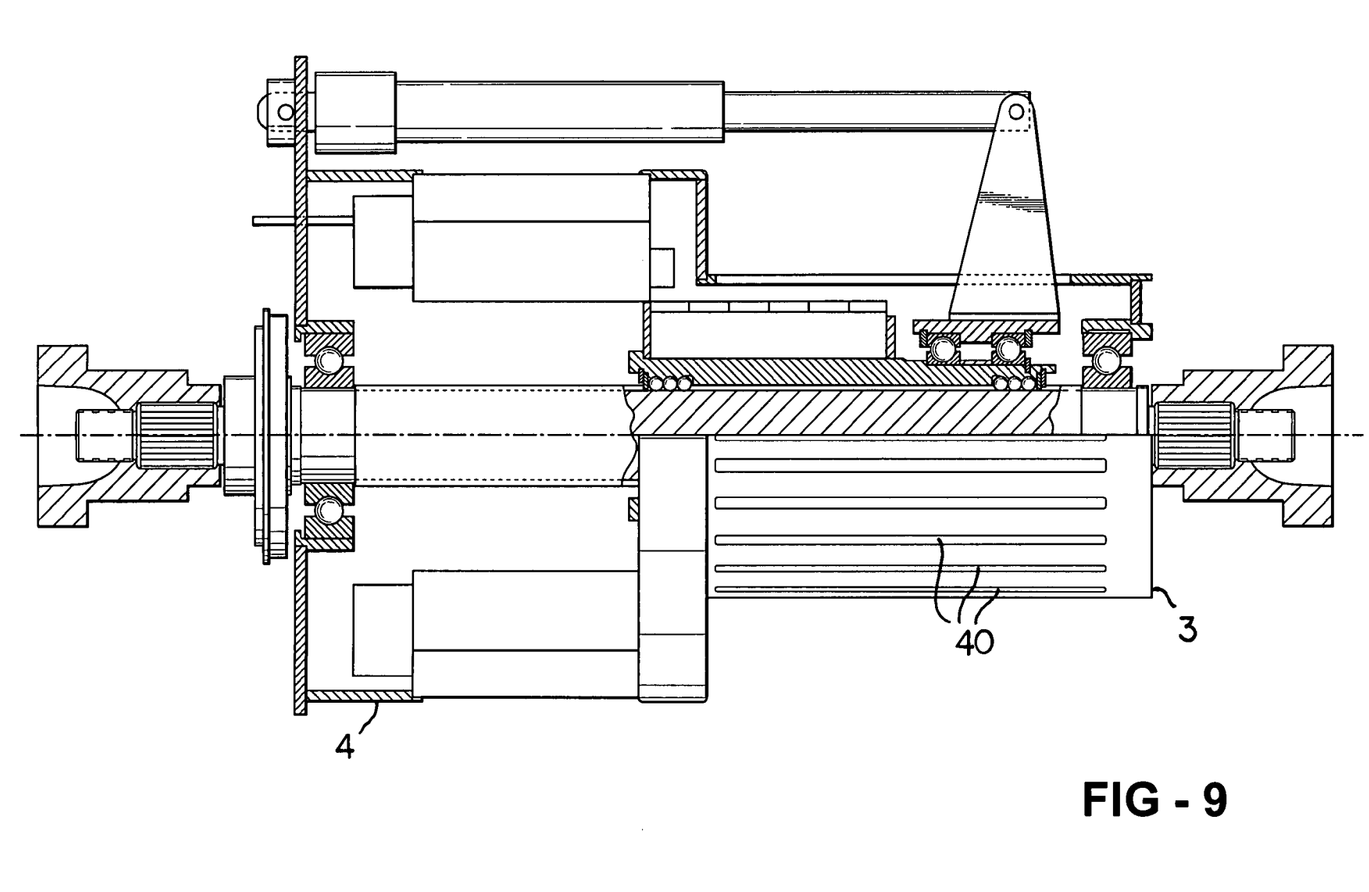
FIG. 9 is partial cross sectional view of a rotor that is fully decoupled with additional details of a housing to reduce torque and eddy current drag.

FIG. 9 is partial cross sectional view of a rotor that is fully decoupled with additional details of a housing to reduce torque and eddy current drag. In order to reduce overall size, the housing portion 3 into which the rotor can be moved can have a smaller diameter than housing portion 4. Since the housing in general can contribute to the production of eddy current loses as the permanent magnet rotor rotates in close proximity to the housing, the housing portion 3 shown in FIG. 9 has been designed and configured to reduce or defeat eddy loss currents. In this regard, the housing is formed with a plurality of slots 40 that function as laminates and greatly increase path length. In addition, the housing portion 3 (and 4 if desired) is made from a material that has a low conductivity property or high electrical resistance such as non-magnetic stainless steel. As an example 300 series non-magnetic stainless steel was found to reduce eddy current loss and provide the additional benefit of lowering cogging torque drive. Reducing eddy current losses helps reduce heating of the housing and thus additional energy losses.

In addition to being useful in parallel hybrid vehicles, the permanent magnet motor/generator of the present invention is useful in wind powered generators in which applications the permanent magnet motor/generator could function as a motor to provide torque to start rotation of a wind mill or turbine and thereafter complete decoupling would eliminate magnet induced torque drag to greatly improve the efficiency of the wind powered generation. Further, the rotor can be progressively engaged with the stator in response to change, in wind speed to affect a desired voltage output.

Although the present invention has been described with reference to a particular means, materials and embodiments, from the ongoing description, one skilled in the art can easily ascertain the essential characteristics of the present invention and various changes and modifications can be made to adapt the various uses and characteristics without departing from the spirit and scope of the present invention as described above.

What is claimed:

1. A permanent magnet motor/generator that comprises:
   a housing;
   a stator located in the housing in a fixed position with respect to the housing, the stator having a plurality of stator magnetic poles and windings for generating a rotating filed in the stator magnetic poles, said stator having a central axis;
   a rotatable shaft extending through the housing and having a central axis which coincides with the central axis of the stator;
   a rotor located in the housing and movably positioned on the rotatable shaft the rotor provided with a plurality of permanent magnets at a peripheral surface thereof and having a central axis which coincides with the central axis of the stator; and
   an actuator for moving the rotor axially along the rotatable shaft within the housing so as to move the rotor while the stator is maintained in a fixed position with respect to the housing, the rotor being moved a sufficient distance relative to the stator to completely decouple the rotor from the stator so as to eliminate magnet induced torque drag.

2. A permanent magnet motor/generator according to claim 1, further comprising a constant velocity bearing which couples the rotor to the rotatable shaft.

3. A permanent magnet motor/generator according to claim 1, further comprising a plurality of ball bearings between the rotor and rotatable shaft.

4. A permanent magnet motor/generator according to claim 3, wherein the rotatable shaft is provided with a plurality of axial grooves for receiving the plurality of ball bearings therein.

5. A permanent magnet motor/generator according to claim 1, further comprising a thrust bearing assembly which couples the actuator to the rotor.

6. A permanent magnet motor/generator according to claim 1, further including a housing for housing the stator and rotor, in which at least a portion of the housing is made from a material having a high electrical resistance so as to reduce eddy loss currents and lower lowering cogging torque drive.

7. A permanent magnet motor/generator according to claim 6, wherein the material having a high electrical resistance comprises non-magnetic stainless steel.

8. A permanent magnet motor/generator according to claim 6, wherein the housing is further provided with slots that reduce eddy loss currents.

9. The permanent magnet motor/generator according to claim 1, in combination with a parallel hybrid vehicle.

10. The permanent magnet motor/generator according to claim 1, in combination with a wind powered generator.

11. A method of method of operating a permanent magnet motor/generator so as to eliminate magnet induced torque drag which method comprises:
 providing permanent magnet motor/generator that includes:
  i) a housing;
  ii) a stator located in the housing in a fixed position with respect to the housing, the stator having a plurality of stator magnetic poles and windings for generating a rotating filed in the stator magnetic poles, said stator having a central axis;
  iii) a rotatable shaft extending through the housing and having a central axis which coincides with the central axis of the stator; and
  iv) a rotor located in the housing and movably positioned on the rotatable shaft, the rotor provided with a plurality of permanent magnets at a peripheral surface thereof and having a central axis which coincides with the central axis of the stator; and
 b) moving the rotor axially along the rotatable shaft within the housing so as to move the rotor while the stator is maintained in a fixed position with respect to the housing, the rotor being moved a sufficient distance relative to the stator to completely decouple the rotor from the stator so as to eliminate magnet induced torque drag.

12. A method of method of operating a permanent magnet motor/generator according to claim 11, wherein the permanent magnet motor/generator is incorporated into a vehicle.

13. A method of method of operating a permanent magnet motor/generator according to claim 12, wherein the rotor is progressively engaged with the stator as the vehicle is decelerated so as to control generated voltage output.

14. A method of method of operating a permanent magnet motor/generator according to claim 11, wherein the permanent magnet motor/generator is incorporated into a wind powered generator.

15. A parallel hybrid vehicle which comprises:
 an internal combustion engine and
 a permanent magnetic motor/generator, wherein the permanent magnet motor/generator includes:
  a housing;
  a stator located in the housing in a fixed position with respect to the housing, the stator having a plurality of stator magnetic poles and windings for generating a rotating filed in the stator magnetic poles, said stator having a central axis;
  a rotatable shaft extending through the housing and having a central axis which coincides with the central axis of the stator;
  a rotor located in the housing and movably positioned on the rotatable shaft, the rotor provided with a plurality of permanent magnets at a peripheral surface thereof and having a central axis which coincides with the central axis of the stator; and
  an actuator for moving the rotor axially along the rotatable shaft within the housing so as to move the rotor while the stator is maintained in a fixed position with respect to the housing, the rotor being moved a sufficient distance relative to the stator to completely decouple the rotor from the stator so as to eliminate magnet induced torque drag.

16. A parallel hybrid vehicle according to claim 15, further comprising a controller that provides active control of rotor position.

17. A parallel hybrid vehicle according to claim 16, wherein the controller progressively engages the rotor with the stator as the vehicle is decelerated so as to control generated voltage output.

18. A parallel hybrid vehicle according to claim 16, wherein the controller fully decouples the rotor from the stator during constant speed operation of a vehicle.

19. A parallel hybrid vehicle according to claim 15, wherein the vehicle further includes a transmission and a drive shaft and the permanent magnet motor/generator is coupled between the transmission and the drive shaft.

20. A parallel hybrid vehicle according to claim 15, wherein the vehicle further includes a drive shaft and transmission having a housing and the permanent magnet motor/generator is housed in the housing of the transmission.

\* \* \* \* \*